United States Patent
Hoffmann et al.

(10) Patent No.: US 6,459,244 B1
(45) Date of Patent: Oct. 1, 2002

(54) METHOD AND DEVICE FOR CHARGING A CAPACITIVE ACTUATOR

(75) Inventors: Christian Hoffmann; Wolfgang Lingl; Richard Pirkl, all of Regensburg (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 10/042,084

(22) Filed: Jan. 7, 2002

Related U.S. Application Data

(63) Continuation of application No. PCT/DE00/02216, filed on Jul. 6, 2000.

(30) Foreign Application Priority Data

Jul. 7, 1999 (DE) .......................................... 199 31 235

(51) Int. Cl.[7] .............................. H02J 7/00; H01L 41/04
(52) U.S. Cl. .............................. 320/166; 310/316; 310/3
(58) Field of Search .......................... 320/166; 318/116; 310/316.03, 317, 315, 316, 341, 346; 123/490

(56) References Cited

U.S. PATENT DOCUMENTS 6,147,433 A * 11/2000 Reineke et al. ........ 310/316.03
6,271,618 B1 * 8/2001 Hoffmann et al. ...... 310/316.03

FOREIGN PATENT DOCUMENTS

| DE | 196 52 801 C1 | 4/1998 |
| DE | 195 29 667 C2 | 7/1998 |
| DE | 197 14 607 A1 | 10/1998 |
| DE | 197 33 560 A1 | 2/1999 |
| JP | 02 103 970 A | 4/1990 |
| JP | 02 286 852 | 11/1990 |
| JP | 10 227 249 A | 8/1998 |

* cited by examiner

*Primary Examiner*—Edward H. Tso
*Assistant Examiner*—Pia Tibbits
(74) *Attorney, Agent, or Firm*—Laurence A. Greenberg; Werner H. Stemer; Ralph E. Locher

(57) ABSTRACT

A method and a device for charging a capacitive actuator are described. The capacitive actuator, in particular for a fuel injection valve of an internal combustion engine, is charged or discharged with different charging and discharging times. In order to shorten the charging time, the capacitance of the recharging capacitor which is dimensioned for a maximum charging time is reduced at a predefined time during the charging process. Two exemplary embodiments of a device for carrying out the method are explained in more detail.

10 Claims, 3 Drawing Sheets

METHOD AND DEVICE FOR CHARGING A CAPACITIVE ACTUATOR

CROSS-REFERENCE TO RELATED APPLICATION

This application is a continuation of copending International Application PCT/DE00/02216, filed Jul. 6, 2000, which designated the United States.

BACKGROUND OF THE INVENTION

Field of the Invention

The invention relates to a method for charging a capacitive actuator, in particular for a fuel injection valve of an internal combustion engine. The invention also relates to a device for carrying out the method.

One of the advantages when actuating fuel injection valves of an internal combustion engine by piezo actuators instead of solenoids is the short switching time of the actuators, which leads to steep needle edges and low degrees of variation of the injected quantities of fuel. From the point of view of combustion technology, charging times that are as short as possible are to be aimed at.

In order to achieve a more gentle combustion profile, the quantity of fuel is divided into a pre-injection quantity and main injection quantity, which permits slower combustion and thus makes it possible to reduce the combustion noise. The actuators have previously been actuated with a constant charging and discharging time (a duration of the transfer of charge from a power source to the actuator, or vice versa), which must be very short (for example 100 $\mu s$) so that a predefined pre-injection fuel quantity can still be injected even in the highest load range or rotational speed range of the internal combustion engine.

The charging process takes place, for example, as a ringing process which includes the charging from one charge source (of a series connection of a charging capacitor and of a recharging capacitor) via a recharging coil to the actuator. An inductance of the recharging coil determining, together with capacitances of the recharging capacitors and of the actuator, the time constant for the charging and discharging processes (the charging and discharging time). Such a device is known from German Patent DE 196 52 801.

German Patent DE 195 29 667 C2 discloses a configuration for the actuation of two piezoelectric actuators in which the frequency of the oscillating circuits in which the piezoelectric actuators are disposed can be changed in order to compensate for temperature effects and aging effects.

Published, Non-Prosecuted German Patent Application DE 197 14 607 A1 describes a method for incrementally charging and discharging a piezoelectric element. The recharging process is switched over to a specific point in time after the start of charging from a charging path with a resistor and a capacitor to a charging path with a coil and a further capacitor. The discharging process takes place in reverse order.

However, the short charging times lead to high noise emissions in frequency ranges which are unpleasant for human ears. This is felt to be very troublesome, for example in a motor vehicle, if the combustion noises are low when the internal combustion engine is idling.

SUMMARY OF THE INVENTION

It is accordingly an object of the invention to provide a method and a device for charging a capacitive actuator which overcome the above-mentioned disadvantages of the prior art devices and methods of this general type, which makes possible a significant reduction in the noise emissions of the actuator.

With the foregoing and other objects in view there is provided, in accordance with the invention, a method for charging a capacitive actuator from a charge source through a series circuit formed of a recharging capacitor and a recharging coil, and for discharging the actuator into the recharging capacitor having a much smaller capacitance than the charge source. The method includes the steps of dimensioning the recharging capacitor to have a maximum capacitance for a predefined maximum charging time; and reducing the capacitance of the recharging capacitor to a predefined value at a specific point in time after a start of a charging process for achieving a shorter charging time.

The charging times and the discharging times of the actuator can be varied, in particular in a low-load and idling range of the internal combustion engine, by various measures during the charging process, for example in a range between 100 $\mu s$ and 200 $\mu s$.

The method according to the invention consists in the fact that the overall capacitance of the recharging capacitors via which the actuator is charged, that is to say in this case the capacitance of at least two recharging capacitors which are connected in parallel and which make possible, for example, a maximum charging time of 200 $\mu s$, is reduced at a specific point in time during a charging process by switching off at least one of the parallel recharging capacitors, as a result of which the charging time is shortened.

The following applies to the selection of optimum charging times. The duration of the charging time limits the minimum period of fuel injection. This is critical in particular at high injection pressures because the injected quantity of fuel rises with the fuel pressure that is proportional to the load, given an identical period of injection. In order to achieve a specific injection quantity, in particular a low pre-injection quantity, ever shorter injection periods are therefore necessary as the fuel pressure increases.

On the other hand, in the case of a main injection, the injection quantities are load-dependent and/or pressure-dependent. Given a low load, small injection quantities are required, but given a high load large injection quantities with a high fuel pressure are required. The correlation between the fuel quantity and fuel pressure permits the use of relatively long charging times for the main injection, even in the high load range.

Within certain limits, for example between 100 $\mu s$ and 200 $\mu s$, different charging times of a capacitive actuator have no influence on the injection profile which is relevant for a combustion process, with the exception of delay effects (delays of the start and end of injection) which can be compensated by shifting the timing of the actuation signals.

In accordance with an added mode of the invention, there are the steps of reaching the maximum capacitance of the recharging capacitor using a parallel connection of at least two recharging capacitors; and disconnecting at least one of the two recharging capacitors from the charge source at the specific point in time after the start of the charging process.

In accordance with an additional mode of the invention, there is the step of using the actuator in a fuel injection valve of an internal combustion engine.

With the foregoing and other objects in view there is provided, in accordance with the invention, a device for charging a capacitive actuator. The device contains a charge source to be connected to a power source, and a first series circuit disposed between the charge source and the capacitive actuator. The first series circuit has a first charge switch, a first blocking diode connected to the first charge switch, a first recharging capacitor connected to the first blocking diode, and a recharging coil connected to the first recharging capacitor. A reference potential terminal is provided. A discharge switch connects a connecting point of the first blocking diode and the first recharging capacitor to the reference potential terminal. At least one second series circuit is provided and contains a second charge switch, a second blocking diode connected to the second charge switch, and a second recharging capacitor connected to the second blocking diode. The second series circuit is connected in parallel with a third series circuit composed of the first charge switch, the first blocking diode and the first recharging capacitor. A control circuit is connected to and controls the discharge switch, the first charge switch and the second charge switch. A third diode is provided for conducting current in a direction of the discharge switch and is connected between the first and second recharging capacitors. A fourth diode is provided for conducting the current and is disposed between the first recharging capacitor and the discharge switch. The first charge switch and the second charge switch are switched on simultaneously, by the control circuit, to charge the capacitive actuator, and one of the first charge switch and the second charge switch is switched off at a specific point in time for removing the capacitive effect of one of the first and second recharging capacitors.

In accordance with an additional feature of the invention, if the discharge switch is conductive, the capacitive actuator is discharged through the first recharging capacitor and through the second recharging capacitor.

In accordance with a further feature of the invention, the first charge switch, the second charge switch and the discharge switch are MOSFET switches.

With the foregoing and other objects in view there is provided, in accordance with the invention, a device for charging a capacitive actuator. The device includes a charge source to be connected to a power source, and a first series circuit disposed between the charge source and the capacitive actuator. The first series circuit has a first charge switch, a first blocking diode connected to the first charging switch and conducts way from the first charge switch, a first recharging capacitor connected to the first blocking diode, and a recharging coil connected to the first recharging capacitor. A reference potential terminal is provided. A second blocking diode is connected to a connection point of the first blocking diode and the first recharging capacitor and conducts current toward the reference potential terminal. A third blocking diode is connected in series with the second blocking diode and has a current conducting direction equivalent to that of the second blocking diode. A discharge switch is connected to the third blocking diode and couples the connecting point of the first blocking diode and of the first recharging capacitor to the reference potential terminal through the second blocking diode and the third blocking diode. A second series circuit is provided and is formed of a second recharging capacitor, a second charge switch connected to the second recharging capacitor, and a fourth blocking diode connected to the second charge switch. The second series circuit is connected between the reference potential terminal and a connecting point of the first recharging capacitor and the recharging coil. The fourth blocking diode conducts current in a direction from the reference potential terminal to the second recharging capacitor. The fourth blocking diode has a cathode connected to the connecting point of the second and third blocking diodes. A control circuit is connected to and controls the discharge switch, the first charge switch and the second charge switch. The first charge switch and the second charge switch are switched on simultaneously, by the control circuit, to charge the capacitive actuator, and one of the first charge switch and the second charge switch is switched off at a specific point in time for removing the capacitive effect of one of the first and second recharging capacitors.

In accordance with another feature of the invention, if the discharge switch is conductive, the capacitive actuator is discharged through the first recharging capacitor, and through the second recharging capacitor and the second charge switch or the fourth blocking diode.

In accordance with a concomitant feature of the invention, the second charge switch is operated inversely with respect to the charge switch, that is to say the second charge switch is switched on when the discharge switch is switched off, and vice versa.

Other features which are considered as characteristic for the invention are set forth in the appended claims.

Although the invention is illustrated and described herein as embodied in a method and a device for charging a capacitive actuator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
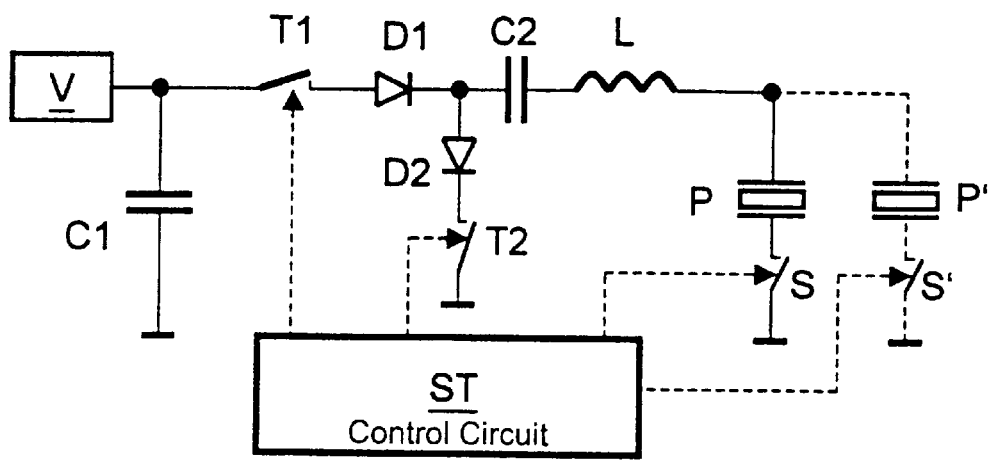
FIG. 1 is a block circuit diagram of a device according to the prior art.

Referring now to the figures of the drawing in detail and first, particularly, to FIG. 1 thereof, there is shown a basic circuit of a known device for charging and discharging a capacitive actuator P. The basic circuit is composed of a series circuit that is connected to a ground reference potential at both ends and is composed of a charge source which can be charged from a power source V, a charging capacitor C1, a charge switch T1, a blocking diode D1, a recharging capacitor C2, a recharging coil L and one or more actuators P, P' which are connected in parallel, and a selection switch S, S' connected in series with each of the actuators P, P'. A terminal of the recharging capacitor C2 which leads to the charge switch T1 can be connected to the ground reference potential via a discharge switch T2 which is in series with a further blocking diode D2. The two switches T1 and T2 are controlled by a control circuit or switch ST. S The capacitance of the charge capacitor C1 is significantly higher than that of the recharging capacitor C2: C1 >>C2.

When the terms charging, discharging or selection switches are used, switches are preferably to be understood which are is switched on or off, for example thyristors, or MOSFETs (with a diode in a series connection) which automatically become non-conductive again if the current flowing then drops to zero.

The charging of the actuator P takes place by closing (switched on) the charge switch T1. Here, the charge moves backward and forward with a current I in the form of a half sinusoidal oscillation of the charge source (the charging capacitor C1) via the recharging capacitor C2 and the recharging coil L to the actuator P. During the charging time, the actuator voltage U rises to a specific value, and the actuator P opens the fuel injection valve.

If the current I drops to zero, the charge switch T1 is opened again (switched off), and the actuator voltage U is maintained until the discharge process starts when the discharge switch T2 is closed (switched on). The charge then moves backward and forward from the actuator P into the recharging capacitor C2 via the recharging coil L. The actuator voltage U drops to zero again, the current I drops to zero and the fuel injection valve is closed by the actuator P. The discharge switch T2 must be opened again (switched off) before the next charging process. An injection process is thus terminated. Recharging into the charging capacitor C1 is prevented by the blocking diode D1.

Figure 2:
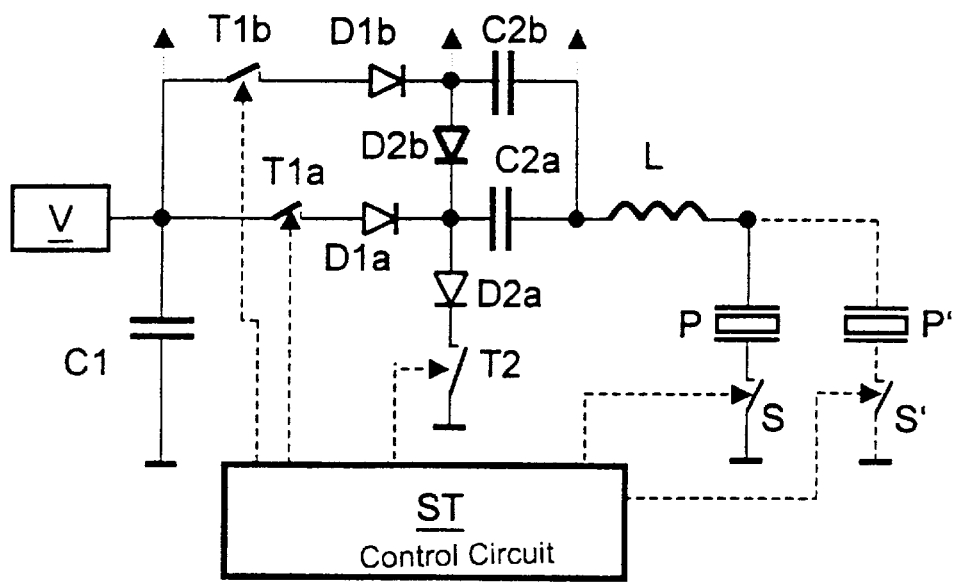
FIG. 2 is a block circuit diagram of a first exemplary embodiment of the device according to the invention.

FIG. 2 shows a circuit of a first exemplary embodiment according to the invention, which differs from the known circuit according to FIG. 1 in that connected in parallel with a first series circuit composed of a charge switch T1$a$, a blocking diode D1$a$ and a recharging capacitor C2$a$ is a second series circuit of the same type. The second series circuit is composed of a further charge switch T1$b$, a further blocking diode D1$b$ and a further recharging capacitor C2$b$ The terminals of the two recharging capacitors C2$a$ and C2$b$ which face the charging switches T1$a$ and T1$b$ are connected to one another by a diode D2$b$ which conducts current from the recharging capacitor C2$b$ to the recharging capacitor C2$a$. Further series circuits of this type that are connected in parallel can be provided, which is indicated by dotted arrows.

Figure 3:
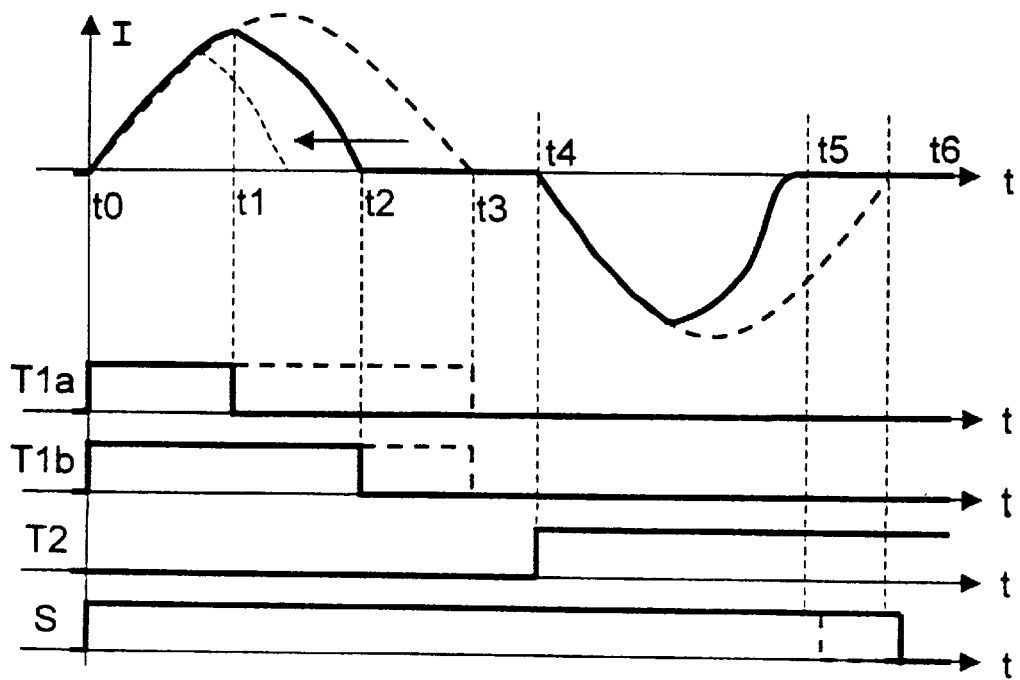
FIG. 3 is a graph of charging and discharging times of the exemplary embodiment shown in FIG. 2.

The mode of operation of the circuit is explained below with reference to the diagram in FIG. 3 showing a current profile I in the actuator P and the switched settings of the charge switches T1$a$ and T1$b$ as well as the discharge switch T2.

The two recharging capacitors C2$a$ and C2$b$ are dimensioned in such a way that the actuator P, (or P') is charged from a parallel connection of the two capacitors C2$a$ and C2$b$ with a desired, maximum charging time of, for example, 200 $\mu$s.

For this purpose, at a point in time T0 (FIG. 3), both charge switches T1$a$ and T1$b$ are switched on simultaneously, as a result of which the actuator P is charged from the capacitors C1, C2$a$ and C2$b$ via the recharging coil L, and a sinusoidal current I begins to flow through the actuator P, which has been selected by the selection switch S. A voltage at both of the recharging capacitors C2$a$ and C2$b$ drops uniformly. If both charge switches T1$a$ and T1$b$ (shown by dashed lines) remain switched on until the current I (dashed curve) drops to zero at the point in time t3, the charging time is t3−t0=200 $\mu$s.

According to the invention, in order to achieve a shorter charging time, the charge switch T1$a$, for example, is prematurely opened at the point in time t1, i.e. switched off. As a result, the current continues to flow only from the series circuit of the two capacitors C1 and C2$b$, as a result of which the current I (unbroken curve) already drops to zero at the point in time t2, at which point in time the second charge switch is also switched off. As a result of this measure, the charging time only then has the duration t2−t0. The end of the charging time which starts at the point in time t0 can be varied in this way between <t1 and t3, as a result of which charging times of <100 $\mu$s up to the selected maximum, here 200 $\mu$s can be selected. At the end of the charging process (t2), there is still a voltage of, for N example, +80 V at the first recharging capacitor C2$a$, which has not been entirely discharged, while the voltage at the second recharging capacitor C2$b$ can be −50 V, for example.

During the discharging of the actuator P, starting for example at the point in time t4, both charge switches T2$a$ and T2$b$ are already switched off, the discharge switch T2 is switched on. As a result, the actuator P is discharged via the recharging coil L into both recharging capacitors C2$a$ and C2$b$ which are now connected in parallel by the diodes D2$a$ and D2$b$. The second recharging capacitor C2$b$ is charged until it reaches the voltage (+80 V) of the first recharging capacitor C2$a$. Both recharging capacitors are then uniformly charged further until the actuator P is discharged. In this way, each discharging time corresponds to the respective preceding charging time. In the selected example, the discharging time (charging time t0 to t2) therefore already ends at the point in time t5 (unbroken curve), instead of at the point in time t6 (dashed curve).

The respective selection switch, S or S', must be switched on, at least from the start (t0) of the charging time up to the end of the discharging time (t5 or t6).

Figure 4:
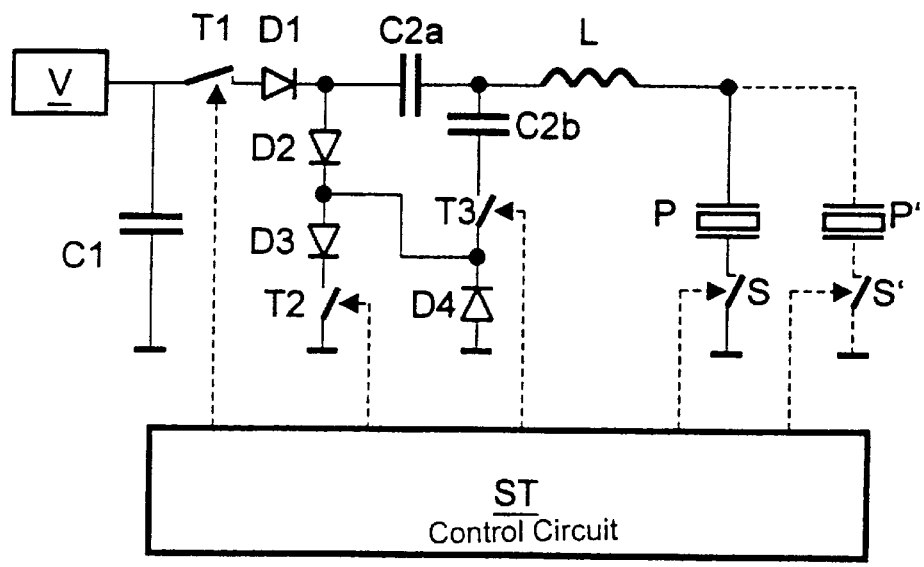
FIG. 4 is a block circuit diagram of a second exemplary embodiment of the device according to the invention.

FIG. 4 shows the circuit of a second exemplary embodiment according to the invention, which differs from the known circuit according to FIG. 1 in that connected in series with the second blocking diode D2 is a third blocking diode D3 with the same current conducting direction, in that a series circuit composed of a second recharging capacitor C2$b$, a further charge switch T3 and a fourth blocking diode D4 is connected to reference potential from the connecting point of the recharging capacitor C2$a$ and the recharging coil L. The anode of the fourth blocking diode D4 conducting current in the direction from the reference potential to the second recharging capacitor C2$b$, and in that the cathode of the fourth blocking diode D4 is connected to the connecting point of the second and third blocking diodes D2, D3. C1 >>C2$a$, C2$b$ also applies here. The two recharging capacitors C2$a$ and C2$b$ are also dimensioned in the exemplary embodiment in such a way that the charging of the actuator P (or P') takes place from a parallel connection of the two capacitors C2$a$ and C2$b$ with a desired, maximum charging time of, for example, 200 $\mu$s.

Figure 5:
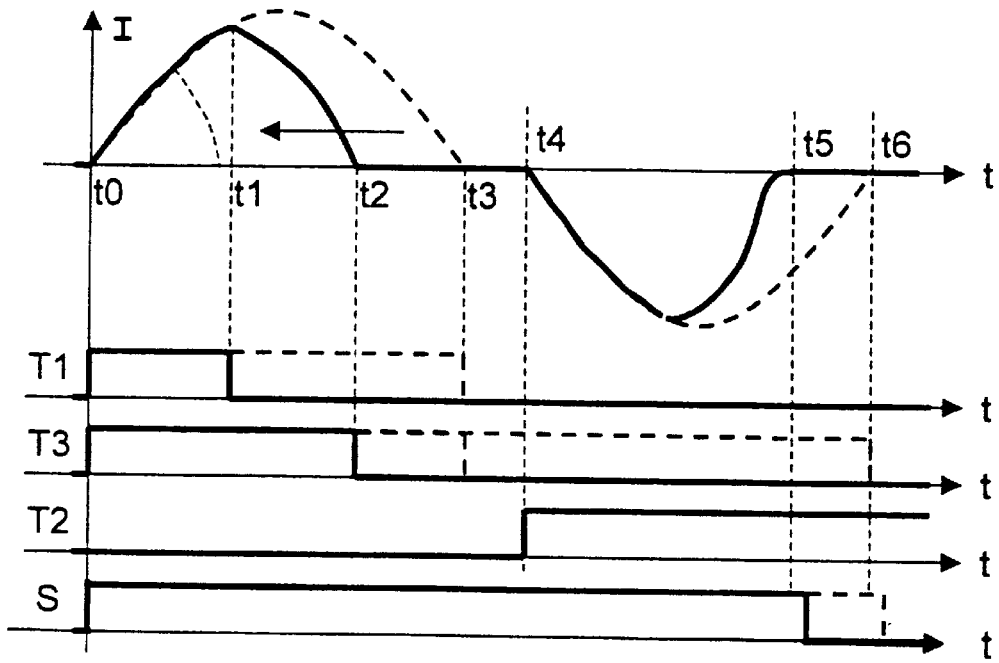
FIG. 5 is a graph of the charging and discharging times of the exemplary embodiment shown in FIG. 4.

For this purpose, at the point in time t0 (FIG. 5), both charge switches T1 and T3 are switched on simultaneously, as a result of which the actuator P is charged from the capacitors C1, C2$a$ and C2$b$ via the recharging coil L, and a sinusoidal current I begins to flow through the actuator P, which has been selected by the selection switch S.

The voltage at both recharging capacitors C2$a$ and C2$b$ drops uniformly. If both charge switches T1 and T3 remain switched on until the current I (dashed curve) drops to zero at the point in time t3, the charging time is thus t3−t0=200 $\mu$s.

In order to achieve a shorter charging time, the charge switch T1 is prematurely opened at the point in time t1, i.e. switched off. As a result, the current continues to flow only from the recharging capacitor C2$b$ via the recharging coil L to the actuator P, and from the actuator P via the selection switch, the blocking diode D4 and the further charge switch T3 back into the recharging capacitor C2b, as it were as a "freewheeling current" in order to discharge C2b and L, until the current drops to zero at the point in time t2 (unbroken curve from t1 to t2 in FIG. 5). During this time the further charge switch T3 must be switched on.

As a result, in the exemplary embodiment also, the charging time continues to have only the duration t2–t0. The end of the charging time which starts at the point in time t0 can in this way be varied between <t1 and t3, as a result of which charging times of <100 µs up to the selected maximum, here 200 µs, can be selected.

At the end of the charging process (t2), there is still, as in the first exemplary embodiment, a voltage of, for example, +80 V at the first recharging capacitor C2a which was not entirely discharged, while the voltage at the second recharging capacitor C2b can be, for example, –50 V.

During the discharging of the actuator P, starting at the point in time t4 (charge switch T1 is switched off), the discharge switch T2 is switched on. If the further charge switch T3 is still switched on at this point in time, the actuator P is discharged, as already described in the first exemplary embodiment, via the recharging coil L into both recharging capacitors C2a and C2b which are now connected in parallel by the diode D2, the second recharging capacitor C2b being charged until it reaches the voltage (+80 V) of the first recharging capacitor C2a. Both recharging capacitors are then uniformly charged further until the actuator P is discharged. In this way, any discharging time corresponds again to the respectively preceding charging time. In the selected example (charging time t0 to t2), the discharging time therefore already ends at the point in time t5 (unbroken curve), instead of at the point in time t6 (dashed curve).

During the discharging of the actuator P, starting at the point in time t4 (FIG. 5), in which the charge switch T1 is switched off, the discharge switch T2 is switched on. Here, the charge switch T3 is either still actively conducting or, if it is embodied as a MOSFET, conducts current in the direction of the discharge switch T2 (illustrated by dashed lines in FIG. 5) through the arbitrarily inverse diode.

As a result, the actuator P is discharged via the recharging coil L into both recharging capacitors C2a and C2b which are connected in parallel, the second recharging capacitor C2b being charged again until it reaches the voltage (+80 V) of the first recharging capacitor C2a. Both recharging capacitors are then uniformly charged further until the actuator P is discharged. In this way, any discharging time corresponds to the respectively preceding charging time. In the selected example (charging time t0 to t2), the discharging time therefore already ends at the point in time t5 (unbroken curve), instead of at the point in time t6 (charging time t0 to t3, shown by the dashed curve). The respective selection switch S or S' must be switched on at least from the start (t0) of the charging time up to the end of the discharging time (t5 or t6).

In the second exemplary embodiment with a shortened charging time (charge switch T1 is switched off before the further charge switch T3), the fuel injection quantity can be minimized by operating the further charge switch T3 and the discharge switch T2 inversely. T3 is switched on when T2 is switched off, and vice versa, as a result of which the discharging time follows the charging time immediately. In the event of T1 and T3 being synchronously switched on at the point in time to and switched off at the point in time T3, an inverse operation of T2 and T3 is to be avoided. If, in fact, T1 and T3 are switched off simultaneously and T2 is switched on, T1 and T2 are switched on owing to brief overlaps and the charging capacitor C1 and the power source V are thus short-circuited.

We claim:

1. A method for charging a capacitive actuator from a charge source through a series circuit formed of a recharging capacitor and a recharging coil, and for discharging the actuator into the recharging capacitor having a much smaller capacitance than the charge source, which comprises the steps of:

dimensioning the recharging capacitor to have a maximum capacitance for a predefined maximum charging time; and reducing the capacitance of the recharging capacitor to a predefined value at a specific point in time after a start of a charging process for achieving a shorter charging time.

2. The method according to claim 1, which comprises:

reaching the maximum capacitance of the recharging capacitor using a parallel connection of at least two recharging capacitors; and disconnecting at least one of the two recharging capacitors from the charge source at the specific point in time after the start of the charging process.

3. The method according to claim 1, which comprises using the actuator in a fuel injection valve of an internal combustion engine.

4. A device for charging a capacitive actuator, comprising:

a charge source to be connected to a power source;

a first series circuit disposed between said charge source and the capacitive actuator, said first series circuit having a first charge switch, a first blocking diode connected to said first charge switch, a first recharging capacitor connected to said first blocking diode, and a recharging coil connected to said first recharging capacitor;

a reference potential terminal;

a discharge switch connecting a connecting point of said first blocking diode and said first recharging capacitor to said reference potential terminal;

at least one second series circuit containing a second charge switch, a second blocking diode connected to said second charge switch, and a second recharging capacitor connected to said second blocking diode, said second series circuit connected in parallel with a third series circuit composed of said first charge switch, said first blocking diode and said first recharging capacitor;

a control circuit connected to and controlling said discharge switch, said first charge switch and said second charge switch, said control circuit switching on simultaneously said first charge switch and said second charge switch for charging the capacitive actuator, and one of said first charge switch and said second charge switch being switched off at a specific point in time for removing a capacitive effect of one of said first recharging capacitor and said second recharging capacitor;

a third diode for conducting current in a direction of said discharge switch and connected between said first and second recharging capacitors; and a fourth diode for conducting the current and disposed between said first recharging capacitor and said discharge switch.

5. The device according to claim 4, wherein if said discharge switch is conductive, the capacitive actuator is discharged through said first recharging capacitor and through said second recharging capacitor.

6. The device according to claim 4, wherein said first charge switch, said second charge switch and said discharge switch are MOSFET switches.

7. A device for charging a capacitive actuator, comprising:

a charge source to be connected to a power source; a first series circuit disposed between said charge source and the capacitive actuator, said first series circuit having a first charge switch, a first blocking diode connected to said first charge switch and conducting away from said first charge switch, a first recharging capacitor connected to said first blocking diode, and a recharging coil connected to said first recharging capacitor;

a reference potential terminal;

a second blocking diode connected to a node between said first blocking diode and said first recharging capacitor and conducting current toward said reference potential terminal;

a third blocking diode connected in series with said second blocking diode and having a current conducting direction equivalent to that of said second blocking diode;

a discharge switch connected to said third blocking diode and coupling said connecting point of said first blocking diode and of said first recharging capacitor to said reference potential terminal through said second blocking diode and said third blocking diode;

a second series circuit formed of a second recharging capacitor, a second charge switch connected to said second recharging capacitor, and a fourth blocking diode connected to said second charge switch, said second series circuit connected between said reference potential terminal and a connecting point of said first recharging capacitor and said recharging coil, said fourth blocking diode conducting current in a direction from said reference potential terminal to said second recharging capacitor, said fourth blocking diode having a cathode connected to said connecting point of said second and third blocking diodes; and a control circuit connected to and controlling said discharge switch, said first charge switch and said second charge switch, said control circuit switching on simultaneously said first charge switch and said second charge switch for charging the capacitive actuator, and one of said first charge switch and said second charge switch being switched off at a specific point in time for removing a capacitive effect of one of said first recharging capacitor and said second recharging capacitor.

8. The device according to claim 7, wherein if said discharge switch is conductive, the capacitive actuator is discharged through said first recharging capacitor, and through said second recharging capacitor and said second charge switch or said fourth blocking diode.

9. The device according to claim 7, wherein said second charge switch is operated inversely with respect to said discharge switch, that is to say said second charge switch is switched on when said discharge switch is switched off, and vice versa.

10. The device according to claim 8, wherein said first charge switch, said second charge switch and said discharge switch are MOSFET switches.

* * * * *